United States Patent [19]

Knoerzer

[11] Patent Number: 5,552,212
[45] Date of Patent: Sep. 3, 1996

[54] HIGH BARRIER FILM COMBINATION

[75] Inventor: Anthony R. Knoerzer, Fairport, N.Y.

[73] Assignee: Mobil Oil Corporation, Fairfax, Va.

[21] Appl. No.: 627,113

[22] Filed: Dec. 13, 1990

[51] Int. Cl.$^6$ .............. B32B 7/02; B32B 27/30; B32B 27/32

[52] U.S. Cl. .............. 428/213; 428/520; 428/522; 428/523

[58] Field of Search .............. 428/35.4, 36.7, 428/520, 515, 523, 213, 522

[56] References Cited

U.S. PATENT DOCUMENTS

| | | | |
|---|---|---|---|
| 3,282,729 | 11/1966 | Richardson et al. | 428/506 |
| 3,719,629 | 3/1976 | Martin et al. | 260/33.2 |
| 4,232,089 | 11/1980 | Bordini et al. | 428/413 |
| 4,240,993 | 12/1980 | Sun | 264/22 |
| 4,254,169 | 3/1981 | Schroeder | 428/35 |
| 4,564,559 | 1/1986 | Wagner, Jr. et al. | 428/349 |
| 4,690,865 | 9/1987 | Fong | 428/341 |

*Primary Examiner*—Dhirajlal Nakarani
*Attorney, Agent, or Firm*—Ronald A. Bleeker; Malcolm D. Keen; Dennis P. Santini

[57] ABSTRACT

A film combination has a pair of polymeric substrate films. At least one surface of each has a surface free energy of at least 35 dynes/cm and a primer coating on each. Each primer coating has a layer of poly(vinylalcohol) containing a cross-linking means. Each film of the pair is positioned with the poly(vinylalcohol) layers in intimate contacting relationship before any substantial cross-linking occurs.

4 Claims, No Drawings

HIGH BARRIER FILM COMBINATION

BACKGROUND OF THE INVENTION

This invention relates to a flexible, multilayer film having high oxygen and moisture barrier characteristics.

Certain polymeric films employed for the packaging of foods inherently permit the transmission of oxygen and moisture from the outside of the film to the inside of a package made up of the film. Oxygen and water vapor both permit rapid deterioration of food packaged in such a container. Their exclusion or control, therefore, is greatly desired.

It is an object of the present invention to decrease the oxygen and water vapor transmission rate of such films so as to improve the integrity of packages made from such films.

SUMMARY OF THE INVENTION

In accordance with the present invention, a film combination comprising a pair of polymeric film substrates, at least one side of each having been treated so as to have a surface-free energy of at least about 35 dynes/cm; each said at least one side having a primer coating thereon; each primer coating carrying a layer of poly(vinylalcohol) containing cross-linking means; said pair having been positioned with the poly(vinylalcohol) layers in intimate contacting relationship before any substantial cross-linking occurs.

The present invention also relates to a process for the preparation of a film combination comprising providing a pair of polymeric film substrates which have been treated on at least one side thereof so as to have a surface free energy of at least about 35 dynes/cm; coating said at least one side of each film with a primer coating; and applying to each primer coating, a layer comprising poly(vinylalcohol) containing cross-linking means; and positioning said pair with the poly(vinylalcohol) layers in intimate contacting relationship so that cross-linking will complete while the poly(vinylalcohol) layers are in contact.

DESCRIPTION OF THE PREFERRED EMBODIMENTS

The substrates contemplated herein include any polymeric film substrate oriented or unoriented which inherently permits the transmission of oxygen and/or moisture and wherein the utility of such film would call for a minimization of such transmission. In most cases, the source of the oxygen referred to herein is atmospheric oxygen and water vapor. While nylon, polyethylene terephthalate, polycarbonate, etc., films are contemplated herein, a particularly preferred class of films are the polyolefins. Within the polyolefin class, homopolymers of propylene and copolymers of propylene and another alpha olefin are preferred. Particularly preferred are isotactic polypropylenes containing at least 80% by weight of isotactic polypropylene. The preferred base substrate layer can be homopolypropylene having a melting point range of from about 321°–336° F. A commercially available material of this description is ARCO W472. The preferred substrate can also be coextruded with a thin skin layer, amounting to from about 2 to about 12% of the total thickness, of a copolymer of propylene and another olefin, e.g., ethylene, butene-1, etc. The other olefin can be present in the copolymer in an amount of from about 1–7 wt %.

In order to effectively inhibit the amount of oxygen and/or moisture transmitted through the film layer, the two substrate layers must be 1) treated to a surface free energy of at least about 35 dynes/cm, 2) have a primer coating applied thereto, and 3) a coating of a layer of cross-linkable poly(vinylalcohol) applied thereto. The two cross-linkable layers must then be pressed into intimate contact during completion of the cross-linking reaction. The resulting film is highly resistant to the transmission of $O_2$ and water vapor and a significant lamination bond exists between the cross-linked PVOH layers.

The preferred substrate must be properly prepared to receive the primer layer followed by the cross-linkable poly(vinylalcohol). This proper treatment involves treating the surface to a surface tension level of at least about 35 and preferably from 38 to 45 dynes/cm in accordance with ASTM Standard D2578-84. The treatment can be flame treatment, plasma treatment, chemical treatment or corona discharge treatment. Flame treatment and corona discharge treatment are preferred with corona discharge treatment being particularly preferred.

Commercially available corona discharge treatment equipment can be obtained from Solo Systems, Inc., Garland, Tex.; Corotec Corporation, Collinsville, Conn.; Softal Electronics, Hamburg, W. Germany; and others. Using, for example, Softal Electronics equipment, a treater can have an air gap of about 0.050 in. when treating polypropylene films of about 0.5 mils. The film can be treated to 42–44 dynes/cm.

After this treatment, a suitable primer material is coated onto the treated surface.

Preferred primer materials are those disclosed in U.S. Pat. No. 4,564,559. These include a primer produced by condensing a monoaldehyde with an interpolymer of acrylamide or methacrylamide and at least one other unsaturated monomer. Further included is a material resulting from condensing aminoaldehyde with acrylamide or methacrylamide and subsequently interpolymerizing the condensation product with at least one other unsaturated monomer in the presence of a $C_1$-$C_6$ alkanol. A preferred primer coating resin of this type comprises a copolymer containing up to 90% by weight of styrene, up to 80% by weight of an alkyl acrylate, up to 15% by weight of methacrylic acid and 5% to 25% by weight of acrylamide which has been condensed with a solution of formaldehyde in n-butanol containing from 0.2 to 3 equivalents of formaldehyde for each amide group in the copolymer. Another primer resin of this type is a 50% solid solution of a copolymer resin containing 38.5 parts of styrene, 44 parts of ethyl acrylate, 2.5 parts of methacrylic acid and 15 parts of acrylamide which has be condensed with 5.2 parts of formaldehyde in n-butanol.

A particularly preferred primer material for the structure contemplated herein has been found to be poly(ethyleneimine), hereinafter, PEI. The imine primer provides an overall adhesively active surface for thorough and secure bonding with the subsequently applied cross-linkable poly(vinylalcohol). It has been found that an effective coating solution concentration of the PEI applied from either aqueous or organic solvent media, such as ethanol, is a solution comprising about 0.1–0.6% by weight of the PEI. A commercially available material of 5 this type is known as Polymin P, a product of BASF-Wyandotte Corporation.

Another particularly preferred primer material is the reaction product of an epoxy resin with an acidified aminoethylated vinyl polymer. The contemplated epoxy resins are glycidyl ethers of polyhydroxy compounds. Typical polyhydroxy compounds which may be used include bisphenol A, ring-substituted bisphenol A, resorcinol, hydroquinone, phenol-formaldehyde, Novolac resins, aliphatic diols, such as ethylene glycol, propylene glycol, 1,4-butanediol, 1,6-hexane-diol, glycerol, lower alkyl hydantoins and mixtures thereof. The preferred epoxy resins of the present invention are those made by the glycidation reaction between epichlorohydrin and bisphenol A. Epoxy resins of this type are commonly classified by their epoxy equivalent weight (EEW) which is defined by the weight of resin in grams which contains one gram equivalent of epoxy groups. Resins with an EEW ranging from 170 to 280 may be used in the present invention, but the preferred range is 180 to 210.

Although the specific structure of the epoxy resin is not critical to the primer employed in the present invention, important considerations in the selection of the epoxy resin revolve around its physical state. For example, it must be liquid and capable of being readily dispersed or dissolved with the second component or curing agent as described hereinbelow. If the epoxy resin is of low viscosity, it may be stirred directly into the second component, i.e., curing agent, however, it is preferred to employ the epoxy resin in an aqueous emulsion.

The second component in the epoxy primer composition of the present invention is an amino modified acrylic polymer which is water soluble. This polymer is a curing agent for the epoxy compound. The preferred material is described in U.S. Pat. No. 3,719,629, the disclosure of which is incorporated herein by reference. This material may be generically described as an acidified aminoethylated interpolymer having pendent aminoalkylate groups. This material is produced by polymerizing acrylate, methacrylate, styrene or other suitable monomers with sufficient methacrylic or acrylic acid to give a —COOH content of about 7.5 to about 12.5%. Solvent polymerization techniques are preferred. The polymer is then reacted with ethyleneimine monomer and acidified with hydrochloric acid to render the polymer water-soluble.

In one embodiment of the present invention, a liquid epoxy resin is emulsified in a solution of the curing agent by rapid stirring, the resultant dispersion is diluted with water to the desired concentration for coating, usually from about 2 to about 20% solids. When mixing the epoxy resin with the curing agent, it is generally preferred to use a stochiometric equivalent balance of epoxy and amine groups. However, it has been found that the stochiometric ratio may be varied over a wide range, from about 1 epoxy to about 3 amine groups through 3 epoxy groups to 1 amine group. Any of the above described primers can be employed in the range of about 0.001 to 3.5 g/m$^2$.

The poly(vinylalcohol) employed herein can be any commercially available material, e.g., ELVANOL 71-30, an E. I. duPont product. The poly(vinylalcohol) coating solution is prepared by dissolving the polymer in hot water, cooling and mixing both with a suitable cross-linking agent and an acid catalyst. The cross-linking agent can be a melamineor urea-formaldehyde resin. Commercially available cross-linkers also would include PAREZ 613, a methylated melamine formaldehyde; CYMEL 373, a methylated melamine formaldehyde; CYMEL 401, a trimethylol melamine urea formaldehyde; glyoxal, borax, etc. An acid catalyst, e.g., ammonium sulfate, ammonium chloride, sulfuric acid, nitric acid and ammonium nitrate, etc., will effectively catalyze these systems.

Cross-linking is carried out not only to make the poly(vinylalcohol) less $O_2$ transmissive and less moisture sensitive but, as has been discovered, to effect an unexpectedly strong bond between the two contacting PVOH layers. It is essential that significant cross-linking not occur before the two poly(vinylalcohol) are brought into contact. This is effected by making up the aqueous solution so that the initial concentration is too low for this to occur but, as drying occurs, the concentration increases and the rate of cross-linking is heightened. This provides adequate time to bring the surfaces together. This is done by using separately formed layered structures or by folding over a single structure to bring the PVOH surfaces together followed by edge trimming.

Suitable concentrations have been found to be from 1 to 10, preferably from 4 to 8 wt % of the solution being polymer plus cross-linking agent plus catalyst. If the solids content is higher, the solution becomes too viscous; if lower, good water resistance is not obtained. From about 5% to 30%, typically 15% cross-linking agent is used with from 0% to 7.5%, typically 2% of the acid catalyst. A preferred formulation comprises the following solids content: 85.5 wt % poly(vinylalcohol); 12.8 wt % methylated melamine formaldehyde; and 1.7 wt % ammonium chloride ($NH_4Cl$).

The aqueous poly(vinylalcohol) solution was prepared by dissolving sufficient ELVANOL 71-30 in hot water to form an 8 wt % solution which was then cooled. To this solution was added a 20 wt % aqueous melamine formaldehyde solution and a 5 wt % aqueous ammonium chloride solution to provide the preferred formulation recited above. The cross-linked poly(vinylalcohol) can be present in from about 0.2 to 3 g/m$^2$.

EXAMPLE

A film that can provide high $O_2$ and moisture barrier regardless of the skin type and allow for any desired coating to be applied to the outside of the film would be unique and desirable. This type of film is illustrated by the following example.

Two homopolymer films were each polyethyleneimine (PEI) primed on one side and then acrylic coated over the PEI. The two films were then PEI primed on the reverse side and coated with PVOH. The PVOH coating contained 2.5 phr of $NH_4Cl$ and 20 phr of Parez 613 (melamine formaldehyde). By running the film through a room temperature nip at 50 fpm and 90 psi, intimate contact between the two PVOH coated surfaces was obtained. The roll was then stored in the Jungle Room (100% RH & 100° F.) for 72 hours. (An alternative to this is storage of the film at ambient conditions, e.g., 35°–90° F. for up to 2 weeks.) This produced a film that was bonded together without the use of an adhesive. The resulting film has a buried, high barrier coating with an acrylic coating on both exposed sides. Any exterior conversion coating may be easily applied prior to applying the PVOH on the opposite surface, and any film desired may be used as a substrate.

A similar lamination technique can be used directly at the back of a commercial coater. By folding a PVOH coated web onto itself, followed by edge trimming, the film can be laminated to itself before the final wind up on the coater. This would again allow any type of film to be used. The double film structure can also have a second coating on both sides of the dual film structure by simply using another top coat station.

What is claimed is:

1. A film combination comprising a pair of polymeric substrate films, at least one side of each having been treated so as to have a surface free energy of at least about 35 dynes/cm; each said at least one side having a primer coating thereon; each primer coating carrying a layer of poly(vinylalcohol) containing cross-linking means; each film of said pair having been positioned with the poly(vinylalcohol) layers in intimate contacting relationship before any substantial cross-linking occurred.

2. The combination of claim 1 wherein said substrate films are homopolypropylene films or homopolypropylene films having a coextruded propylene-ethylene copolymer layer on at least one side thereof amounting to from about 2 to about 12% of the total thickness.

3. The combination of claim 1 wherein the primer coating is poly(ethyleneimine).

4. The combination of claim 1 wherein said cross-linking means is an acid catalyzed cross-linker.

* * * * *